(12) United States Patent
Oi et al.

(10) Patent No.: US 6,453,933 B1
(45) Date of Patent: Sep. 24, 2002

(54) CONTAINER VALVE

(75) Inventors: Akira Oi; Norio Daicho; Masaru Takeda, all of Amagasaki (JP)

(73) Assignee: Kabushiki Kaisha Neriki, Hyogo (JP)

( * ) Notice: Subject to any disclaimer, the term of this patent is extended or adjusted under 35 U.S.C. 154(b) by 0 days.

(21) Appl. No.: 09/680,466

(22) Filed: Oct. 6, 2000

(30) Foreign Application Priority Data

Oct. 8, 1999 (JP) ............................................. 11-287518

(51) Int. Cl.$^7$ ................................................ B08B 9/087
(52) U.S. Cl. ....................................... 137/242; 251/214
(58) Field of Search .................................. 251/214, 215, 251/225, 144, 264, 291, 900, 335.1; 137/242, 244; 215/4

(56) References Cited

U.S. PATENT DOCUMENTS

| | | | | |
|---|---|---|---|---|
| 1,975,178 A | * | 10/1934 | Smith et al. ................. 137/384 |
| 2,784,933 A | * | 3/1957 | Newell et al. ................. 169/37 |
| 3,237,917 A | * | 3/1966 | Kunzer et al. ............... 251/214 |
| 3,356,335 A | * | 12/1967 | Koch et al. .................. 251/214 |
| 3,851,853 A | * | 12/1974 | Teeters ....................... 251/214 |
| 4,384,705 A | * | 5/1983 | Kato ........................... 251/214 |
| 4,684,106 A | * | 8/1987 | Kolenc et al. ............. 251/335.1 |
| 4,860,784 A | * | 8/1989 | Petersen et al. ......... 137/315.28 |
| 4,898,210 A | | 2/1990 | Nitta ....................... 137/614.19 |
| 4,928,919 A | | 5/1990 | Daicho et al. ................ 251/89 |
| 5,743,288 A | * | 4/1998 | Mosman et al. ........ 137/315.28 |

* cited by examiner

Primary Examiner—Lesley D. Morris
Assistant Examiner—Patrick Buechner
(74) Attorney, Agent, or Firm—Bacon & Thomas, PLLC

(57) ABSTRACT

A container valve (2) comprises a housing (3) within which a fluid inlet (5) communicates with a fluid outlet (7) via a valve seat (9) and a valve chamber (10). A closure member (15) is inserted into the valve chamber (10). A spindle (17) is inserted into a guide hole (14) which communicates with the valve chamber (10). The closure member (15) is connected to a handle (18) through the spindle (17). The handle (18) enables the closure member (15) to operate for opening and closing with respect to the valve seat (9). An annular scraper (21) is attached between the closure member (15) and a peripheral wall of the valve chamber (10). The annular scraper (21) has a lip (21a) whose inner peripheral surface is brought into contact with an outer peripheral surface of the closure member (15). A sealing member (23) is attached between the closure member (15) and the guide hole (14).

6 Claims, 5 Drawing Sheets

CONTAINER VALVE

BACKGROUND OF THE INVENTION

1. Technical Field

The present invention relates to a container valve and more specifically to a technique for enabling the container valve to open and close smoothly over a prolonged period of time.

2. Explanation of Earlier Technology

A closure member is inserted into a valve chamber hermetically partitioned by a diaphragm. The closure member is brought into closing contact with a valve seat through the diaphragm with a screw thrust of a spindle arranged outside the diaphragm. There is a conventional container valve which separates the closure member from the valve seat with an urging force of a spring for valve opening attached within the valve chamber, contrary to the above construction.

A certain kind of fluid to be accommodated in a container, for example, such as specific soil fumigant, comes to be like tar upon contact with the air and resides and solidifies at that tar state in the container.

When the specific fluid of this kind is used in the conventional diaphragm-type container valve, as the container valve repeatedly opens and closes, the residue is going to stickily adhere to the spring for valve opening attached within the valve chamber. This results in being unable to extend and contract the spring for valve opening. Accordingly, there was a likelihood that the container valve could not open nor close at an earlier time after having commenced to use it.

SUMMARY OF THE INVENTION

The present invention has an object to provide a container valve which can smoothly open and close over a prolonged period of time.

In order to accomplish the above-mentioned object, the present invention has constructed a container valve in the following manner, for example, as shown in FIGS. 1 to 3.

The container valve comprises a housing 3 within which a fluid inlet 5 communicates with a fluid outlet 7 via a valve seat 9 and a valve chamber 10. A closure member 15 is inserted into the valve chamber 10, which communicates with a guide hole 14. Inserted into the guide hole 14 is a transmission member 17, through which the closure member 15 is connected to an operation means 18. The operation means 18 enables the closure member 15 to operate for opening and closing with respect to the valve seat 9. An annular scraper 21 is attached between the closure member 15 and a peripheral wall of the valve chamber 10. The annular scraper 21 has an inner peripheral surface brought into contact with an outer peripheral surface of the closure member 15. A sealing member 23 is attached in at least any one of spaces defined between the closure member 15 and the guide hole 14, between the closure member 15 and the inner peripheral surface of the scraper 21, between the transmission member 17 and the guide hole 14, and between the transmission member 17 and the inner peripheral surface of the scraper 21.

The present invention as shown in FIGS. 1 to 3 produces the following function and effect.

When using fluid which comes to be like tar upon contact with the air and resides and solidifies, for example, such as specific soil fumigant, in a container valve, the residue adheres to an outer peripheral surface of a closure member of the container valve.

However, on switching over the closure member from a closed position to an opened position and switching over it from the opened position to the closed position by the operation means, the annular scraper scrapes off the residue adhered to the outer peripheral surface of the closure member. This prevents the residue from invading a space between the closure member and the guide hole to result in the possibility of smoothly opening and closing the closure member for a long period of time.

Besides, a sealing member is attached between at least one of the guide hole and the inner peripheral surface of the scraper, and at least one of the closure member and the transmission member. The valve chamber can keep its hermetical state by the sealing member. This can surely inhibit the leak-out of the fluid within the valve chamber.

Concretely, the sealing member can be attached between the closure member and the inner peripheral surface of the scraper and/or between the transmission member and the guide hole. Further, in the case where the closure member is inserted throughout the guide hole and the valve chamber, for example, as shown in FIG. 1, it can be also attached between the closure member and the guide hole. Besides, in the event that the transmission member is inserted throughout the guide hole and the valve chamber, the sealing member can be attached between the transmission member and the scraper.

Additionally, the sealing member will be able to inhibit the leak-out of the fluid within the valve chamber more assuredly if it is attached at a plurality of portions. For instance, it is possible to prevent the fluid from invading the space defined between the guide hole and the transmission member and damaging the movement of the transmission member and so on for a prolonged period of time.

The annular scraper is generally fixed to a peripheral wall of the valve chamber. Concretely, for example, as shown in FIGS. 1 to 3, a cap member 13 provided with the guide hole 14 is fixed to the housing 3 in screw-thread engagement. The annular scraper is held between the cap member and the peripheral wall of the valve chamber.

Further, in order to accomplish the above object, another embodiment of the invention has constructed a container valve in the following manner, for example, as shown in FIG. 4.

The container valve comprises a housing 3 within which a fluid inlet 5 communicates with a fluid outlet 7 via a valve seat 9 and a valve chamber 10. A closure member 15 is inserted into the valve chamber 10 and is connected to an operation means 18 through a transmission member 17. The operation means 18 enables the closure member 15 to operate for opening and closing straightly with respect to the valve seat 9. An annular diaphragm 41 is provided so as to cover the valve chamber 10. The diaphragm 41 has an outer peripheral edge portion hermetically fixed to a peripheral wall of the valve chamber 10 and has an inner peripheral edge portion hermetically fixed to the closure member 15.

According to this embodiment of the invention, the operation means can move the closure member for opening through the transmission member. Therefore, differently from the above-mentioned conventional structure, it dispenses with the necessity of attaching the spring for valve opening within the valve chamber. This reduces the number of parts to be attached within the valve chamber and also simplifies the attaching structure within the valve chamber. As a result, it can largely decrease damage caused by the residue of the specific fluid to thereby lengthen the term during which the contained valve can smoothly open and close.

Further, in this embodiment of the invention, if the annular diaphragm has a face on the valve chamber side, which is formed from synthetic resin of self-lubrication type, the residue of the specific fluid hardly adheres to the diaphragm. This enables the container valve to smoothly open and close over a far longer period of time.

In addition, in order to accomplish the above object, yet another embodiment of the invention has constructed a container valve in the following manner, for example, as shown in FIG. 5.

According to this embodiment, the invention, there is provided the slide member formed from synthetic resin of self-lubrication type between the closure member and the peripheral wall of the valve chamber. Thus it is possible to easily scrape from the slide member, the residue of the specific fluid which has entered a space between the slide member and the closure member. This results in greatly reducing the disadvantages caused by the residue of the specific fluid, such as damaging the movement of the closure member, to lengthen the term during which the container valve can open and close smoothly.

The slide member may be formed in the shape of a cylinder fixed to the valve chamber, for example, as shown in FIG. 5. Alternatively, the peripheral wall of the valve chamber may have an inner surface lined or coated with synthetic resin of self-lubrication type and/or the closure member may have an outer peripheral surface lined or coated with synthetic resin of self-lubrication type. The thus formed coating layer may compose the slide member.

DESCRIPTION OF THE PREFERRED EMBODIMENTS

First Embodiment

Figure 1:
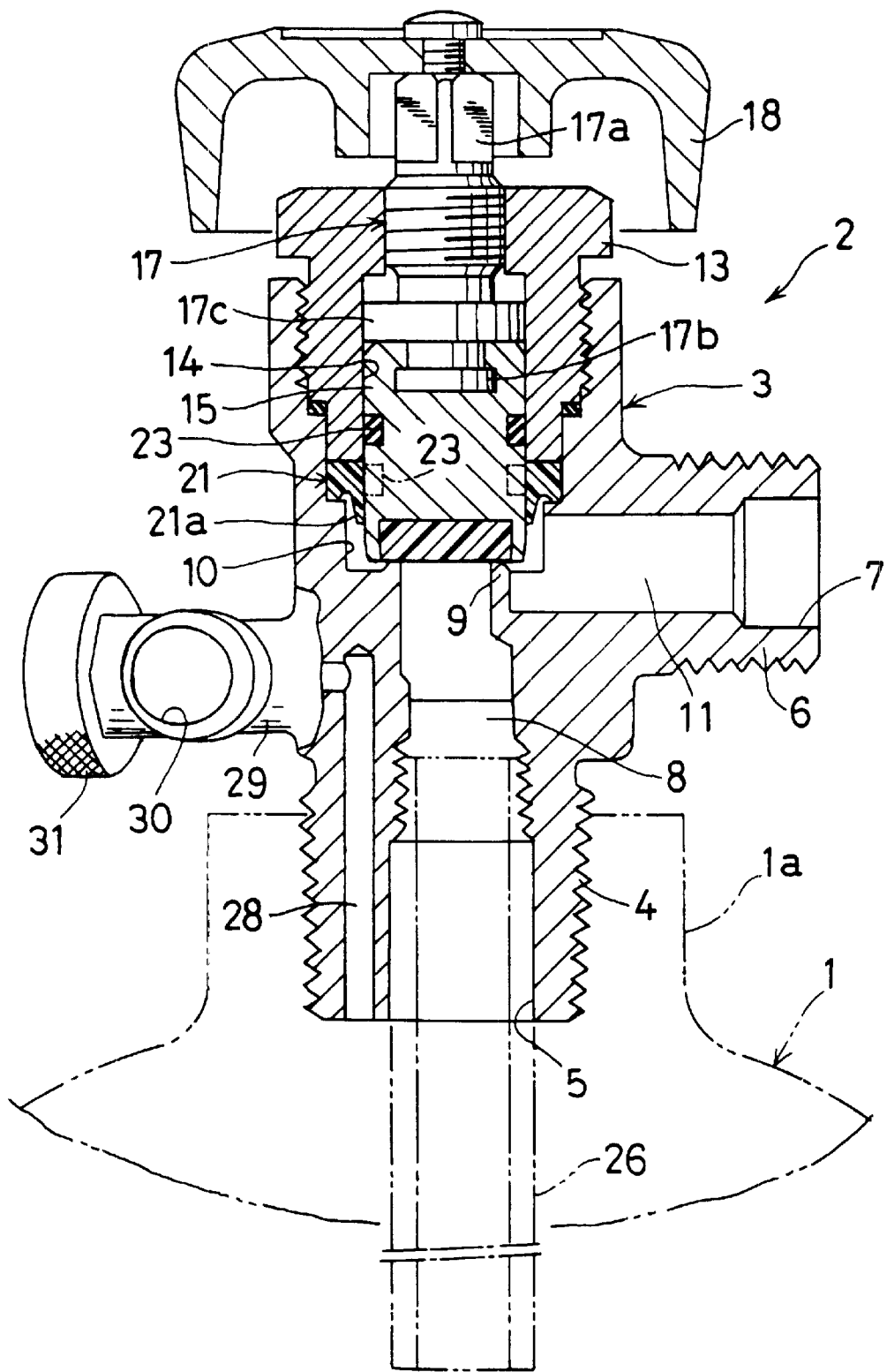
FIG. 1 shows a first embodiment of the present invention and is a vertical sectional view of a container valve.

FIG. 1 shows a first embodiment of the present invention and is a vertical sectional view of a container valve. In this first embodiment, a container 1 accommodates soil fumigant mainly consisting of 1,3-dichloropropene. Here the soil fumigant is non-pressure and transparent liquid and has such a characteristic that comes to be like tar upon contact with the air and ultimately solidifies.

The container 1 has a neck portion 1a able to engage with a threaded leg portion 4 of a housing 3 of a container valve 2 in screw-thread fitting. The threaded leg portion 4 has a bottom surface opened to provide a fluid inlet 5. A fluid outlet 7 is provided by opening a right end surface of an outlet nozzle 6 projecting laterally from the housing 3. The fluid inlet 5 communicates with the fluid outlet 7 via an inlet passage 8, a valve seat 9, a valve chamber 10 and an outlet passage 11, in order.

The housing 3 has an upper portion engaged with a cylindrical cap member 13 hermetically in screw-thread fitting. There is formed within the cap member 13, a guide hole 14 which communicates with the valve chamber 10. A closure member 15 is inserted throughout the guide hole 14 and the valve chamber 10.

Further, a spindle 17 of a transmission member makes a screw engagement with an upper mid portion of the cap member 13 so as to be able to advance and retreat. The spindle 17 has at its upper end an input portion 17a, to which a handle 18 of an operation means is fixed. The spindle 17 has at its lower end an output portion 17b, which is connected to an upper portion of the closure member 15.

An annular scraper 21 made of synthetic resin is attached between the closure member 15 and a peripheral wall of the valve chamber 10. The annular scraper 21 is pushed downwards by a bottom surface of the cap member 13. This brings an outer peripheral surface and a bottom surface of the scraper 21 into a hermetical contact with the peripheral wall of the valve chamber 10. The scraper 21 has a lip 21a an inner peripheral surface of which is brought into a strong contact with an outer peripheral surface of the closure member 15. A sealing member 23 is attached between the closure member 15 and the guide hole 14.

A lead-out duct 26 engages with a peripheral wall of the inlet passage 8 in screw-thread fitting. The lead-out duct 26 has a lower end projecting into a lower portion of an interior space of the container 1. Further, a pressurizing passage 28 is formed in parallel with the inlet passage 8 within the threaded leg portion 4. The housing 3 has a branched portion 29 projecting leftward therefrom, within which a pressurizing valve (not shown) is provided. The pressurizing passage 28 has an upper portion communicating with a pressurizing port 30 through the pressurizing valve. The pressurizing valve within the branched portion 29 is opened and closed by a wheel-like operation member 31.

When taking out the liquid soil fumigant accommodated in the container 1, the spindle 17 is rotated for loosening by the handle 18 to raise the closure member 15, thereby separating the closure member 15 from the valve seat 9. In addition, the operation member 31 is rotated for loosening to open the pressurizing valve (not shown), thereby supplying pressurizing gas such as nitrogen gas fed to the pressurizing port 30, to the interior space of the container 1 via the pressurizing valve and the pressurizing passage 28. Then pressurizing force of the pressurizing gas takes the liquid soil fumigant within the container 1 out of the fluid outlet 7 through the lead-out duct 26, the inlet passage 8, the valve seat 9, the valve chamber 10 and the outlet passage 11 in order.

When stopping the take-out, the operation member 31 is rotated for fastening to close the pressurizing valve and the spindle 17 is rotated for fastening by the handle 18, thereby lowering the closure member 15 to bring it into closing contact with the valve seat 9.

The first embodiment can be modified as follows.

The sealing member 23 may be attached between a guide portion 17c of the spindle 17 and the guide hole 14 instead of or in addition to attaching it between the closure member 15 and the guide hole 14.

The sealing member 23 may be attached between the closure member 15 and the inner peripheral surface of the scraper 21 (see one-dot chain line in FIG. 1) instead of or in addition to the above-mentioned attaching structure.

The scraper 21 may be formed from a metal, ceramics or the like instead of synthetic resin and besides may be made of the metal or the ceramics each bonded with synthetic resin.

It is possible to omit the pressurizing passage 28, the pressurizing valve and the like which supply the pressurizing gas to the interior space of the container. In the event the pressurizing gas need be supplied, the container may be additionally provided with another container valve having a pressurizing passage and a pressurizing valve.

(First Modification of the First Embodiment)

Figure 2:
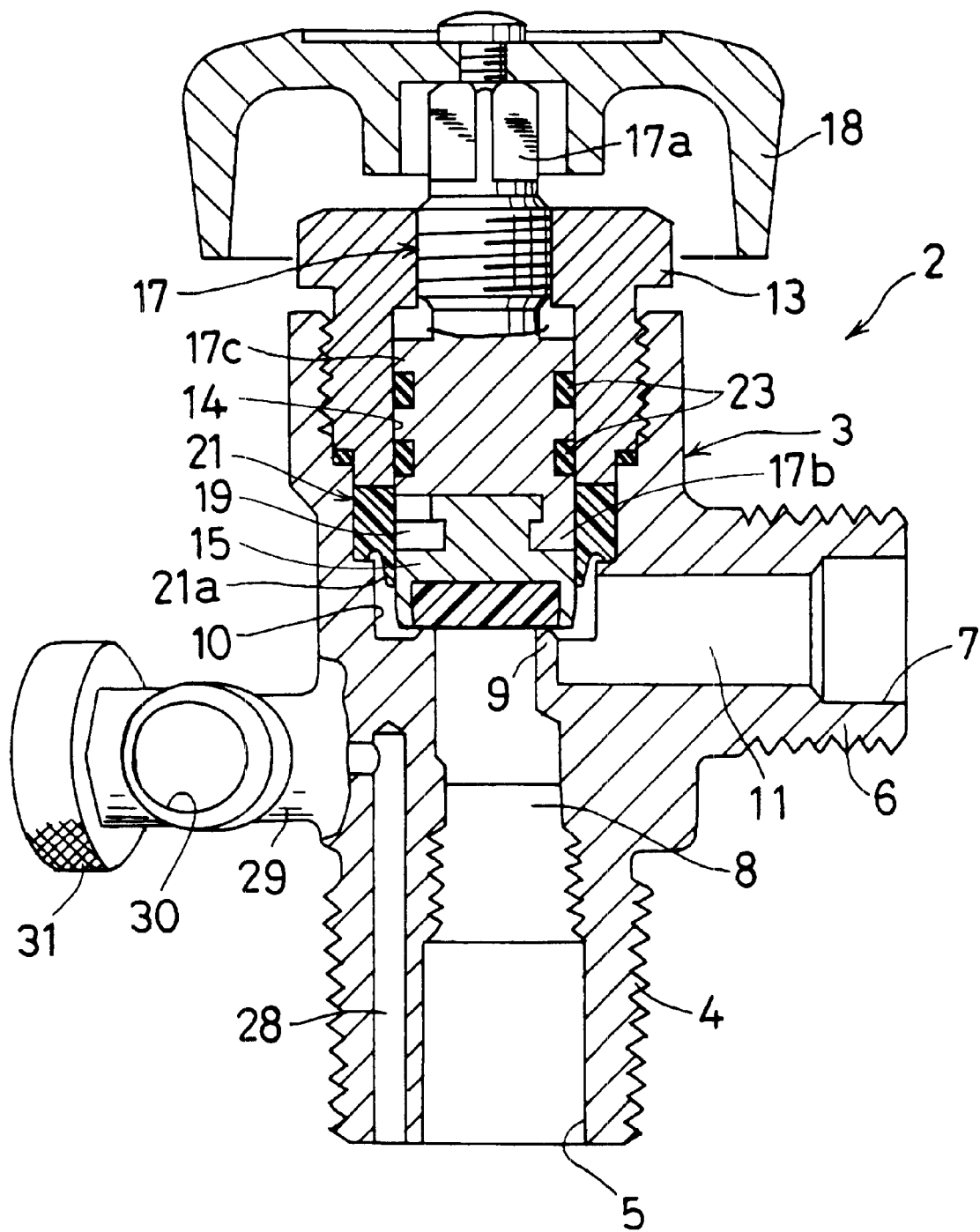
FIG. 2 shows a first modification of the first embodiment of the present invention and is a vertical sectional view of a container valve.

FIG. 2 shows a first modification of the first embodiment. In this first modification, the handle 18 is connected to the closure member 15 through the spindle 17 and enables the closure member 15 to operate for opening and closing with respect to the valve seat 9 as well as in the first embodiment. However, differently from the first embodiment, the spindle 17 is inserted throughout the guide hole 14 and the valve chamber 10. Two sealing members 23 are attached at two portions between the guide portion 17c of the spindle 17 and the guide hole 14. On the other hand, the closure member 15 is inserted into the valve chamber 10 in its entirety. The closure member 15 is exchanged if it has consumed due to a long use. This modification inserts the whole closure member 15 into the valve chamber 10. Accordingly, it is possible to simply take the closure member 15 out of a cutout portion 19 formed in the output portion 17b of the spindle 17 and easily exchange it with a new one only by dismounting the cap member 13 to remove the scraper 21. In addition, since both of the sealing members 23 are attached around the spindle, it is sufficient if merely a small number of parts are changed when exchanging the closure member 15.

Second Modification of the First Embodiment

Figure 3:
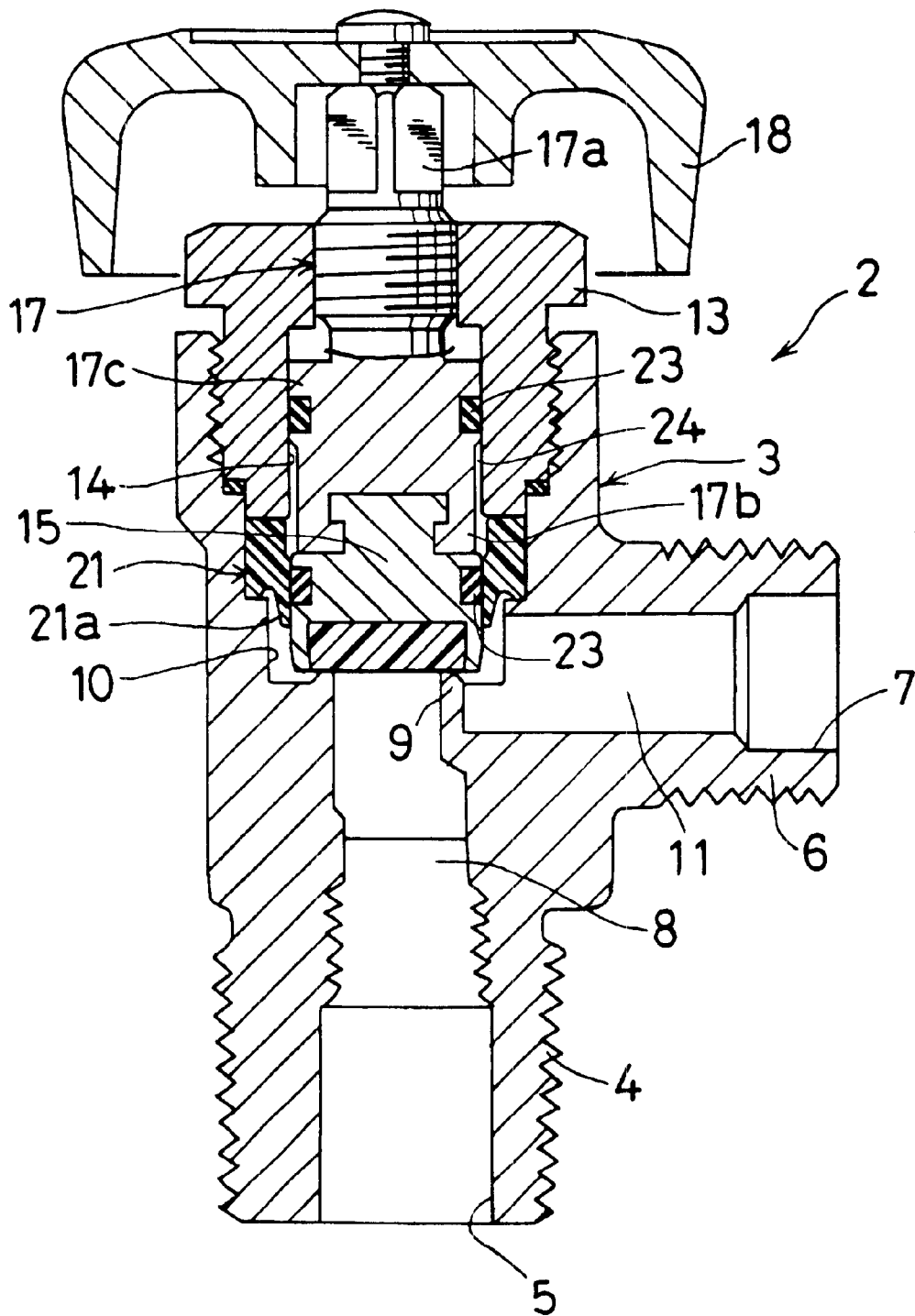
FIG. 3 shows a second modification of the first embodiment of the present invention and is a vertical sectional view of a container valve.

FIG. 3 shows a second modification of the first embodiment. In this second modification, sealing members 23 are attached between the closure member 15 and the scraper 21 as well as between the guide portion 17c of the spindle 17 and the guide hole 14. As such, when at least one of the sealing members 23 is attached between the closure member 15 and the scraper 21, namely at a position nearer to the valve chamber, the fluid invades the surroundings of the spindle and the closure member in a reduced area. In this modification, differently from the first embodiment, no pressurizing passage is formed within the threaded leg 4. The pressurizing gas is supplied into the container through another container valve (not shown).

Additionally, in this second modification, the spindle 17 has its guide portion 17c radially reduced between the two sealing members 23, 23. A space 24 is defined between the thus radially reduced guide portion 17c and the guide hole 14. Therefore, should part of the fluid pass through one of the sealing members 23 closer to the valve chamber, the thus leaked out fluid stays within the space 24 and therefore reduces the likelihood that the fluid leaks out of the other sealing member 23 attached between the guide portion 17c of the spindle 17 and the guide hole 14. This results in more assuredly preventing the fluid from invading the surroundings of the threaded portions of the spindle 17.

Second Embodiment

Figure 4:
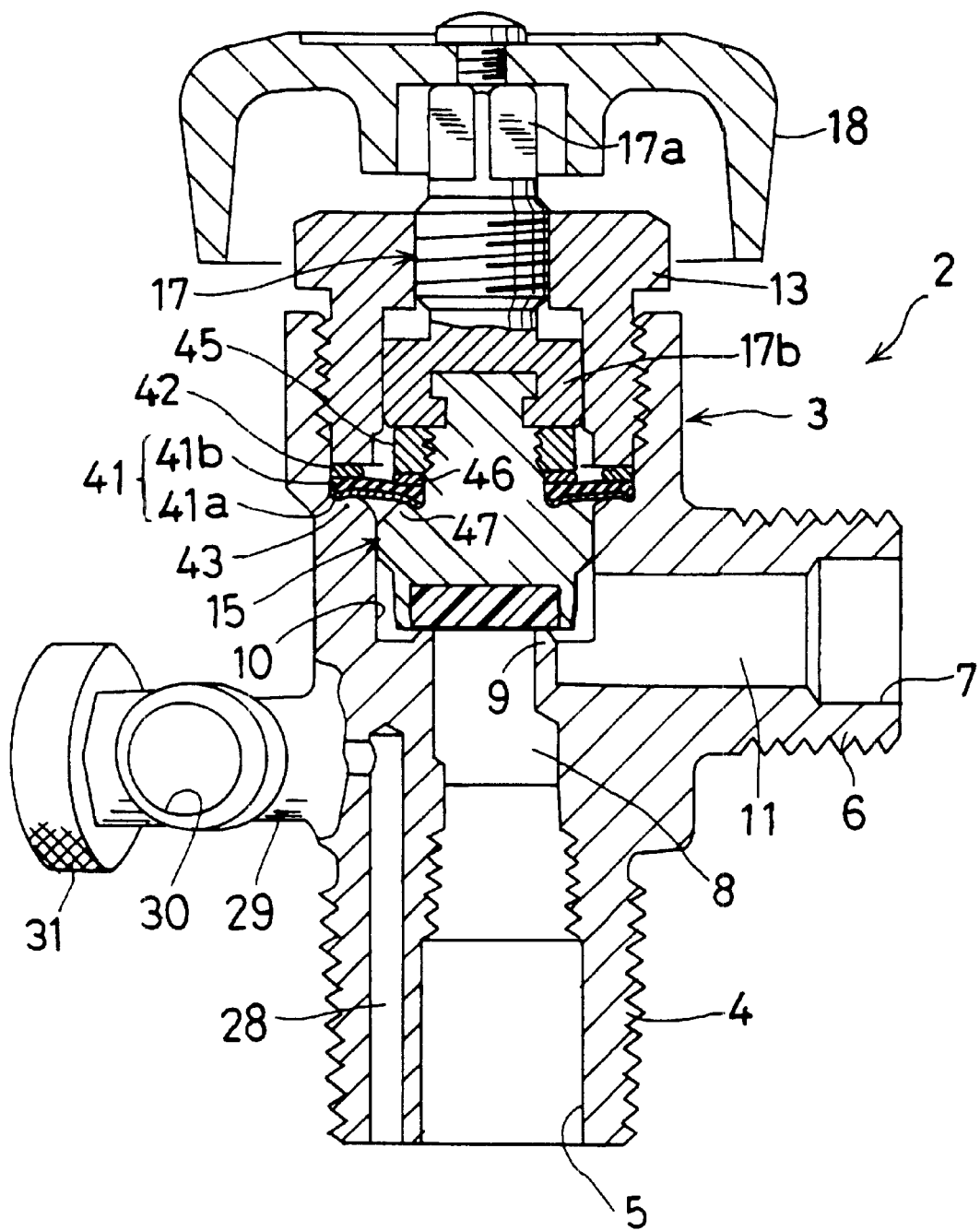
FIG. 4 shows a second embodiment of the present invention and is a vertical sectional view of a container valve.

FIG. 4 shows a second embodiment of the present invention. In the second embodiment, the same constituent members as those in the first embodiment are, in principle, explained by attaching the same characters.

Like the first embodiment, the closure member 15 can be operated for opening and closing vertically with respect to the valve seat 9 by the handle 18 of the operation means. The valve chamber 10 is covered with an annular diaphragm 41. The annular diaphragm 41 comprises a lower surface portion 41a and an upper surface portion 41b vertically bonded with each other. The lower surface portion 41a is made of anti-corrosive and self-lubricating synthetic resin such as fluororesin. The upper surface portion 41b is formed from rubber reinforced by cloth.

The annular diaphragm 41 has an outer peripheral edge portion hermetically fixed to a stepped portion 43 of the peripheral wall of the valve chamber 10 through the cap member 13 and an external ring 42. Further, the annular diaphragm 41 has an inner peripheral edge portion hermetically fixed to a shoulder portion 47 of the closure member 15 through a nut 45 and an internal ring 46.

An upper surface of the stepped portion 43 is provided with a concave portion as well as an upper surface of the shoulder portion 47. In correspondence with these concave portions, the annular diaphragm 41 has each of an outer peripheral edge and an inner peripheral edge formed to be downwardly convex. This can hermetically fix the inner and the outer peripheral edge portions of the annular diaphragm 41 with assuredness.

The second embodiment can be modified as follows.

The annular diaphragm 41 may consist of at least three individual diaphragms bonded with one another instead of two individual diaphragms bonded with each other or may be formed from only a single diaphragm. The diaphragm 41 may be made of a metal instead of synthetic resin, rubber or the like.

Third Embodiment

Figure 5:
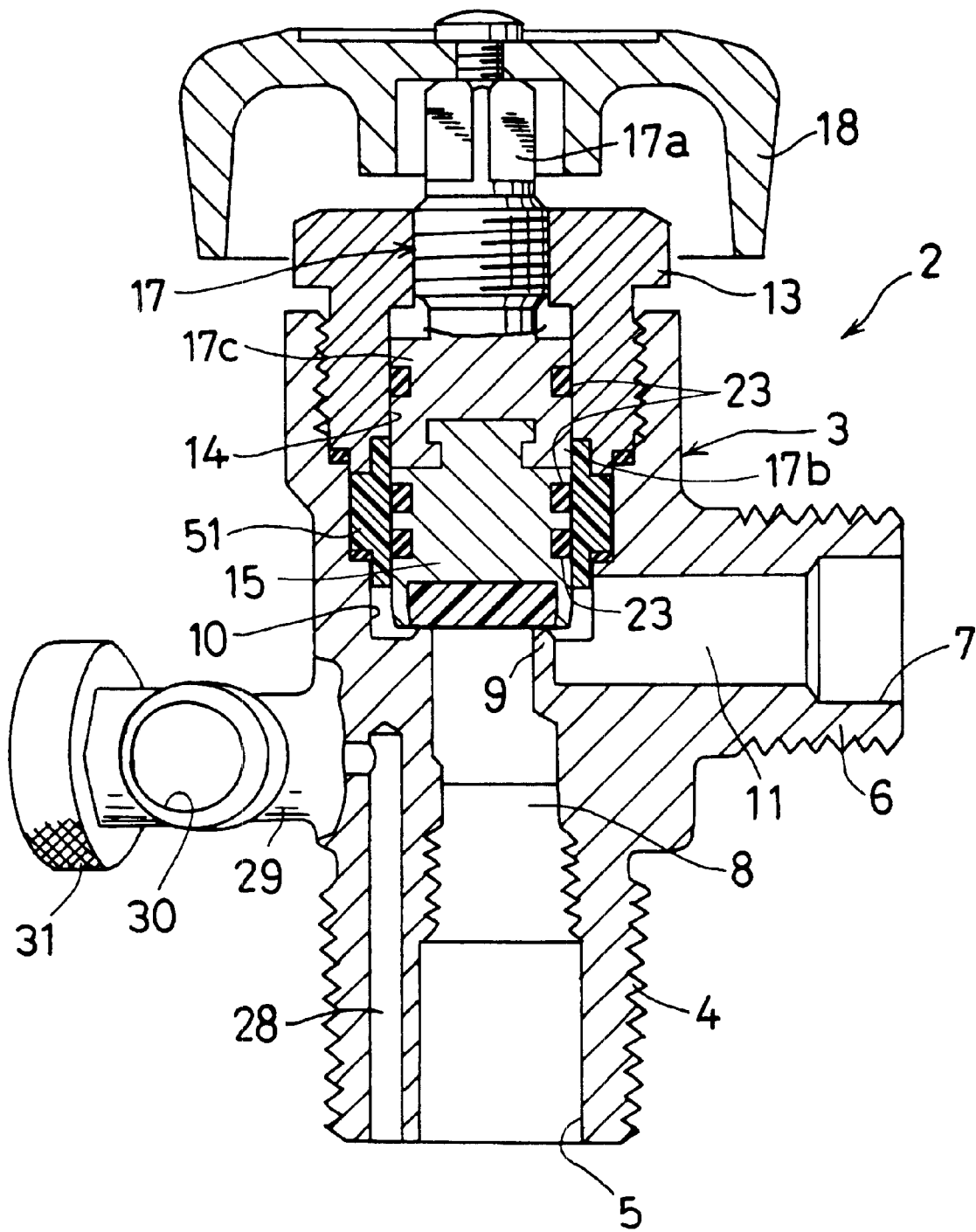
FIG. 5 shows a third embodiment of the present invention and is a vertical sectional view of a container valve.

FIG. 5 shows a third embodiment of the present invention. In this third embodiment, the same constituent members as those in the first embodiment are, in principle, explained by attaching the same characters.

Like the second embodiment, the closure member 15 can be operated for opening and closing with respect to the valve seat 9 by the handle 18 of the operation means. Further, a cylindrical slide member 51 is attached between the peripheral wall of the valve chamber 10 and the closure member 15.

The cylindrical slide member 51 is formed from anti-corrosive and self-lubricating synthetic resin such as fluororesin and is attached so as to be held between the cap member 13 and the peripheral wall of the valve chamber 10. The cylindrical slide member 51 has an inner peripheral surface brought into contact with the closure member 15. A sealing member 23 is attached between this closure member 15 and the slide member 51.

The slide member 51 may be integrally coated on an inner surface of the peripheral wall of the valve chamber 10 and on an outer peripheral surface of the closure member 15 through lining or coating instead of being the cylinder attached between the peripheral wall of the valve chamber 10 and the closure member 15.

The respective first, second and third embodiments can be further modified as follows.

An electric motor, a hydraulic cylinder or the like actuator may be employed for the operation means instead of the exemplified handle 18.

Further, the transmission member may be a rod which connects the actuator to the closure member 15 instead of the exemplified screw-type spindle 17. Additionally, the transmission member may be formed integrally with the closure member 15 instead of forming it separately from the closure member 15.

The fluid to be accommodated in the container 1 may be liquefied gas or compressed gas instead of the liquid.

Besides, the fluid to which the present invention is applied is not limited to the fumigant. It is a matter of course that the present invention is applicable to various kinds of fluid.

What is claimed is:

1. A container valve comprising:
   a housing (3) within which a fluid inlet (5) communicates with a fluid outlet (7) via a valve seat (9) and a valve chamber (10) having a peripheral wall, a closure member (15) being inserted into the valve chamber (10);
   a guide hole (14) which communicates with the valve chamber (10);
   a transmission member (17) inserted into the guide hole (14);
   an operation means (18) connected to the closure member (15) through the transmission member (17) and enabling the closure member (15) to operate for the opening and closing with respect to the valve seat (9);
   an annular scraper (21) positioned radially between the closure member (15) and the peripheral wall of the valve chamber (10) and having an inner peripheral surface brought into contact with the closure member (15) such that said annular scraper (21) removes residue adhered to an outer peripheral surface of said closure member (15) when said closure member (15) is switched over from a closed position to an open position; and
   a sealing member (23) attached between at least one of the closure member (15) and the transmission member (17), and at least one of the guide hole (14) and the inner peripheral surface of the scraper (21).

2. The container valve as set forth in claim 1, wherein the closure member (15) is inserted throughout the guide hole (14) and the valve chamber (10), and
   the sealing member (23) is attached in at least any one of spaces defined between the closure member (15) and the inner peripheral surface of the scraper (21), between the closure member (15) and the guide hole (14), and between the transmission member (17) and the guide hole (14).

3. The container valve as set forth in claim 1, wherein the transmission member (17) is inserted throughout the guide hole (14) and the valve chamber (10), and
   the sealing member (23) is attached in at least any one of spaces defined between the closure member (15) and the inner peripheral surface of the scraper (21), between the transmission member (17) and the inner peripheral surface of the scraper (21), and between the transmission member (17) and the guide hole (14).

4. The container valve as set forth in claim 1, wherein the sealing member (23) is attached at a plurality of portions.

5. The container valve as set forth in claim 1,
   wherein the scraper (21) is fixed to the peripheral wall of the valve chamber (10).

6. The container valve as set forth in claim 5, wherein a cap member (13) is fixed to the housing (3) and has the guide hole (14) formed therewithin, and the scraper (21) is held between the cap member (13) and the peripheral wall of the valve chamber (10).

* * * * *